Oct. 10, 1961   D. R. MERCHANT   3,003,818
TRACTOR COUPLED DUMPING TRAILER
Filed Jan. 22, 1960   2 Sheets-Sheet 1

Inventor:
Don R. Merchant,
By
Harold J. Lecoute
Atty.

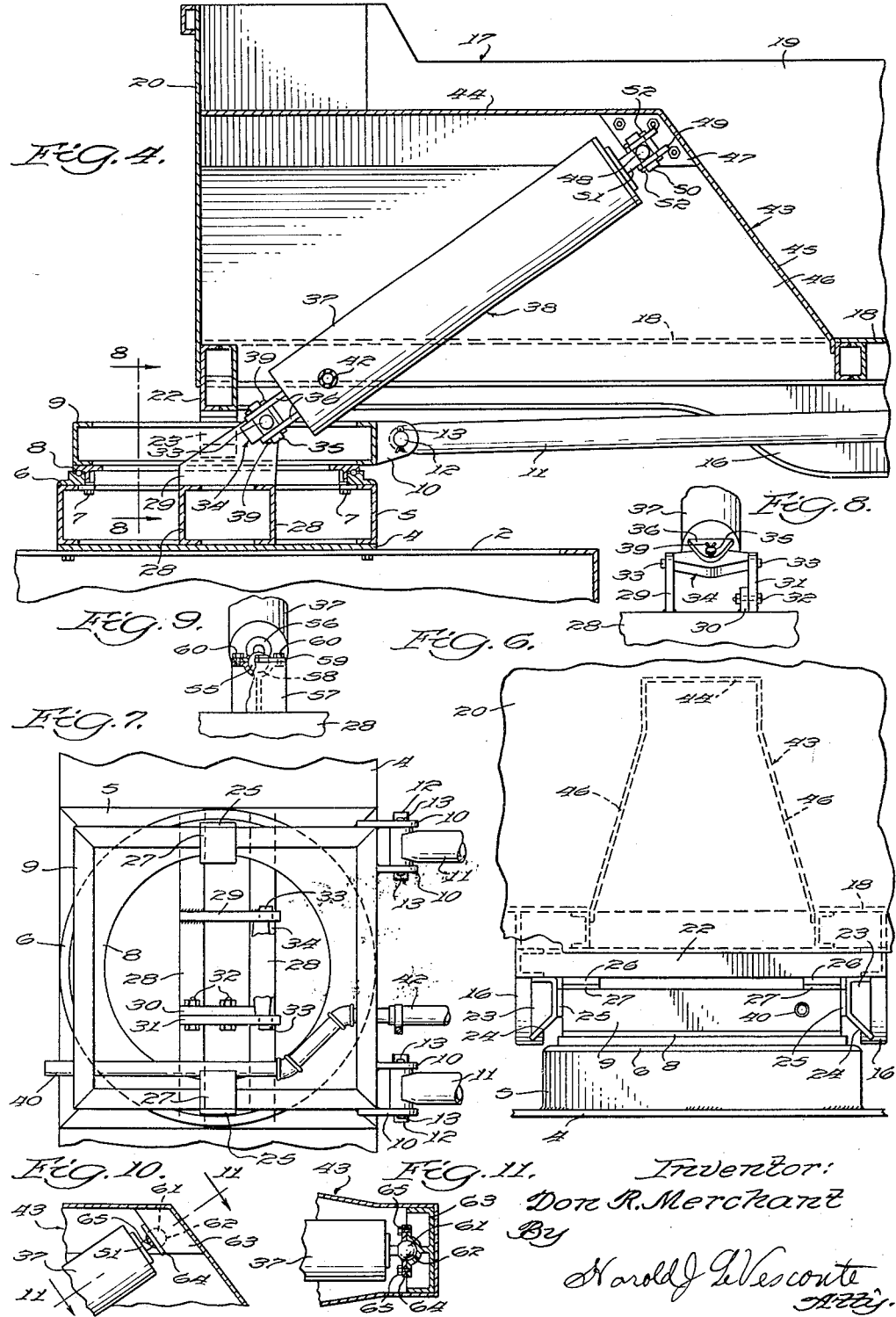

United States Patent Office 3,003,818
Patented Oct. 10, 1961

3,003,818
TRACTOR COUPLED DUMPING TRAILER
Don R. Merchant, Glendale, Calif.
(137 Dale Place, Concord, Calif.)
Filed Jan. 22, 1960, Ser. No. 4,047
12 Claims. (Cl. 298—20)

This invention relates to normally inseparable tractor-trailer combinations as distinguished from those combinations having readily engageable and disengageable coupling devices, and particularly to a combination of tractor and trailer including an improved means for elevating the front end of the trailer for dumping the contents or load thereof.

The principal object of the invention is to provide a dumping trailer component of an articulated tractor and trailer combination in which the trailer is normally inseparably connected to the tractor and in which trailer dumping means is provided including a hydraulic ram mechanism having one component thereof attached directly to the tractor frame independently of the fifth wheel and a relatively movable component attached to the trailer and in which the connecting means between the tractor and trailer and the attaching means where the hydraulic ram mechanism permits actuation of the hydraulic ram in all angular relative positions of the tractor and trailer and permits movement of the tractor and trailer in all conditions, of extension or retraction of the hydraulic ram mechanism.

Figure 1:
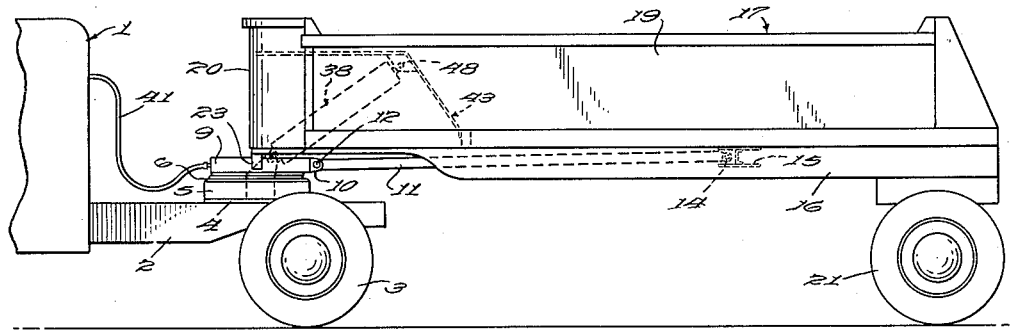
Figure 3:
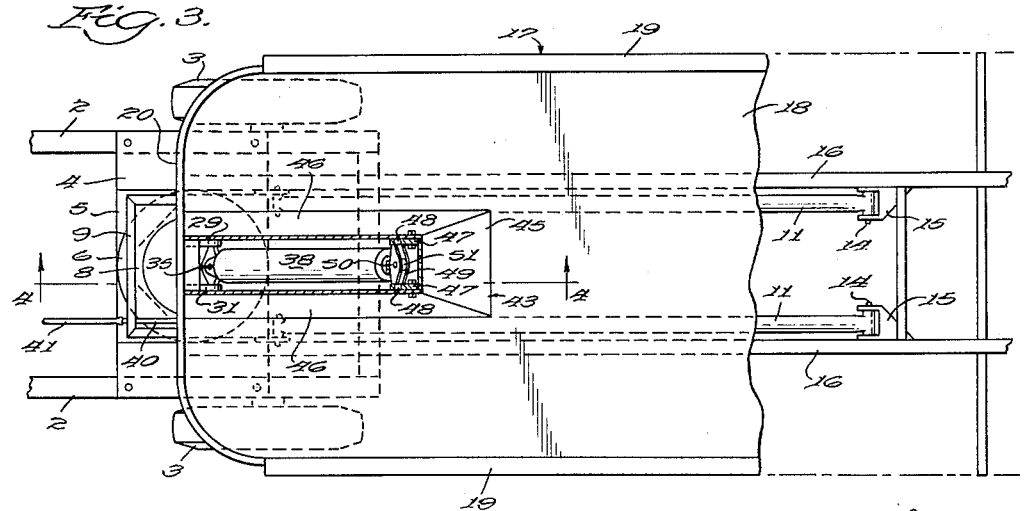
Figures 2, 5:
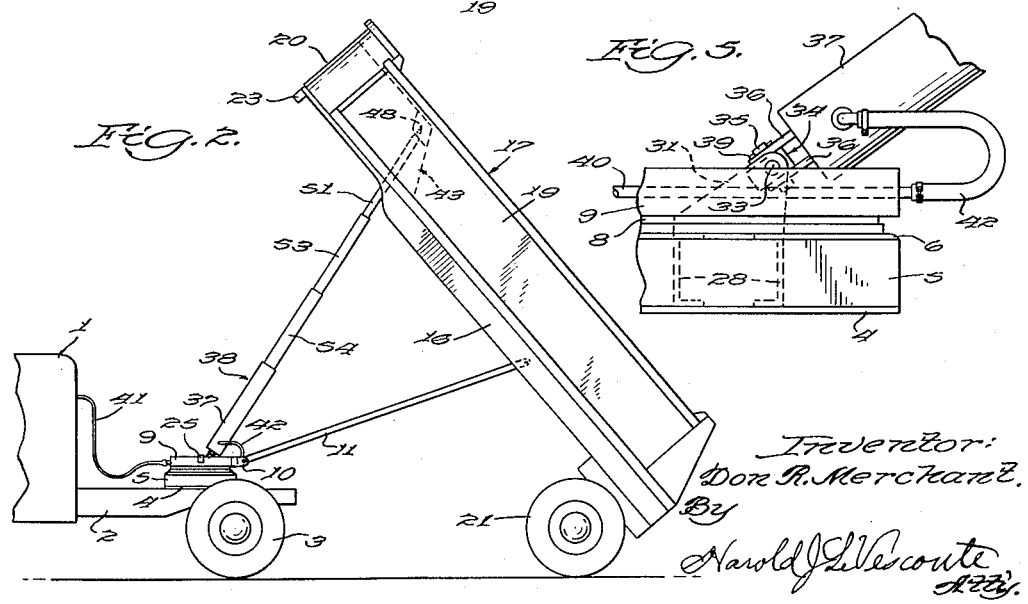

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a side elevational view of a trailer and the rear end of a tractor connected thereto embodying the present invention, the trailer being in lowered or load carrying position, FIG. 2 is a similar side elevational view in reduced scale showing the trailer in dumping position, FIG. 3 is an enlarged, fragmentary, top plan view of the rear end of the tractor and the front end of the trailer resting thereon in load carrying position, certain portions of the trailer structure being broken away to illustrate details of construction otherwise concealed, FIG. 4 is a still further enlarged, fragmentary, side elevational sectional view taken on the line 4—4 of FIG. 3, FIG. 5 is a fragmentary side elevational view of the rear portion of the fifth wheel structure particularly showing the fluid conduit connection between the fifth wheel and the hydraulic ram mechanism, FIG. 6 is a fragmentary front elevational view of the trailer in lowered position resting on the fifth wheel carried by the tractor, FIG. 7 is a top plan view of the fifth wheel component carried by the tractor as viewed when the front end of the trailer is elevated, the hydraulic ram mechanism being omitted from the view for clearness of illustration, FIG. 8 is a fragmentary front elevational sectional view taken on the line 8—8 of FIG. 4, FIG. 9 is a fragmentary, front elevational view similar to FIG. 8, but showing an alternative form of connection between the hydraulic ram and the tractor, FIG. 10 is a fragmentary, side elevational view showing an alternative form of connection between the hydraulic ram and the trailer body, and FIG. 11 is a sectional view taken on the line 11—11 of FIG. 10.

Referring to the drawings, the illustrated embodiment of the invention includes a tractor 1 having rearwardly extending parallel frame members 2, 2 supported by the rear wheels 3, 3 and adjacent to the support by the tractor wheels carrying a transversely extending bolster 4 on which is mounted a hollow rectangular subframe 5 to which the stationary component 6 of a fifth wheel assembly is secured by bolts 7. The illustrated fifth wheel comprises a fixed ring member 6 having a groove in the upper face thereof and a relatively rotatable ring 8 having a complementary groove opposing the groove in the member 6 and these grooves combined to form a raceway for a plurality of bearing balls. It is to be understood, however, that any open ring type of fifth wheel structure may be employed and that the invention is not necessarily limited to the specific form shown, that form being one of several different types which are available on the market. Fixed to the upper surface of the fifth wheel ring 8 is a second hollow rectangular subframe 9 and which and the side thereof rearwardly with respect to the tractor is provided with two pairs of spaced ear portions 10, 10. Each pair of ear portions forms a yoke between which the forward end of a reach 11 is secured by a clevis pin 12, the clevis pin being secured against endwise movement by cotter pins 13, 13 at each end thereof.

The reaches 11, 11 extend rearwardly in spaced parallel relation and are connected by crosspins 14, 14 between the arms of yoke members 15, 15 carried by longitudinal frame members 16, 16 forming the supporting framework for the trailer body 17; said trailer body comprising a floor 18, side panels 19, 19, a front end wall 20, and a rear end gate construction not shown. Suitable structure at the rear end of the trailer frame affords connection for an axle carrying wheel 21. The trailer frame further includes a cross member 22 extending beneath the floor and interconnecting the forward ends of the longitudinal frame members 16, 16. The under face of the cross member 22 carries spaced depending guide members 23, 23 having downwardly diverging confronting faces 24, 24 which engage wear plates 25, 25 carried by the sides of the subframe member 9 to hold the trailer in alignment with the fifth wheel construction and further carrying wear plates 26, 26 which rest on complementary wear plates 27, 27 carried by the top face of the subframe 9 to support the weight of the trailer on the subframe.

Extending transversely of the subframe 5 at approximately the center thereof are opposed channel members 28, 28 the upper ends of which lie in the plane of the top surface of the subframe 5. Extending transversely of these channel members 28, 28 and disposed inwardly of one side of the longitudinal center line of the fifth wheel member there is a trunnion carrying member 29. Also welded to the top faces of the members 28, 28 is a transversely extending lug 30 to which a second trunnion carrying member 31 is secured by a series of bolts 32 said second trunnion carrying member except for its mode of attachment being identical with the member 29 and being disposed at an equal distance from the center line of the fifth wheel extending longitudinally of the tractor. Mounted in bearings formed in the members 29 and 31 are the journal end portions 33, 33 of a trunnion member 34 which at its mid-length is secured by a pivot pin 35 between the yoke arms 36, 36 at the cylinder end 37 of the hydraulic ram assembly generally designated by 38, the axial line of said pin being normal to the axial line of the journals 33, 33. Cotter pins 39, 39 secure the pin 35 against endwise movement. It will be noted that the axis of the bearing portions of the trunnion 34 is in the plane of the top surface of the subframe 9. Pin 35 combines with the trunnion bearings 33, 33 since, as to form a universal joint best shown in FIG. 4, the center line of the trunnions is located in the plane of top surface of the subframe 9.

The subframe 9 carries a pipe 40 extending rearwardly therethrough, said pipe at its forward end being connected to a hose 41 leading to the source of hydraulic pressure on the tractor and having sufficient slack to permit the turning movement of the subframe 9 of the fifth wheel incident to turning movement between the tractor and trailer. At its rear end, the pipe 40 is connected by a hose 42 to the lower end of the cylinder 37 of the hydraulic ram assembly 38, the hose 42 having sufficient slack therein to permit the movement of the hydraulic ram about the axis of the trunnion bearings 33, 33.

The floor of the trailer body at the forward end is interrupted by an inverted hood construction 43 rising from the floor and affording an opening in the lower surface of the trailer into which the hydraulic ram assembly extends and is housed when the trailer is in its lowered position as best shown in FIG. 4. The hood construction 43 includes a top wall 44, a rear wall 45 and side walls 46, 46. Bolted to the inner face of the side walls 46, 46 at the juncture of the top wall 44 and rear wall 45 therewith, are trunnion supporting members 47, 47 having aligned transverse bearings for the journal portions 48, 48 of a trunnion member 49 comprising spaced parallel bars extending between the journal portions 48, 48. A pivot pin 50 pivotally connects the end of the hydraulic ram piston 51 between the space bars of the trunnion. The axis of the pivot pin 50 is coincident with and transverse to the axis of the journal portions 48, 48 whereby the trunnion combines with the members 47 and the piston 51 to form a second universal joint. Cotter pins 52, 52 serve to hold the pin 50 against endwise movement.

The hydraulic ram assembly may consist of any desired or required numbers of nested cylinder-piston elements, the illustrated embodiment including telescoping cylinder-piston elements 53 and 54 interposed between the cylinder 37 and the piston 51. This is determined by the amount of lift required and by the space available for housing the collapsed hydraulic ram within the hood portion of the trailer body.

Referring finally to FIGS. 9 through 11, there is shown an alternative form of connection of the hydraulic ram device with the tractor and trailer embodying ball and socket joints in place of the universal type joints shown in the preceding figures. Considering FIGS. 9 and 10, the end of the cylinder 37 carries a ball 55 having a base portion 56 which is welded to the cylinder head. The bolster 5 within the perimeter of the fifth wheel carries an upstanding bracket 57 terminating in a hemispherical socket 58 in which the ball 55 is received. A diametrically split, two-piece retaining ring 59 is secured to the upper face of the bracket 57 by screws 60, said ring being complementary to the socket and serving to hold the ball 55 therein while permitting a wide range of relative movement between the ball and socket. In FIG. 11, is shown a similar arrangement between the end of the piston 51 and the trailer. The end of the piston rod 51 terminates in a ball 61 which is received in a hemispherical socket 62 carried by a bracket means 63 secured in the upper rear portion of the hood by welding or other appropriate means. The outer face of the bracket carries a second, two-part retainer ring 64 secured thereto by screws 65 and serving to retain the ball 61 within the socket 62 while permitting a wide range of angular movement between the ball and socket incident to all relative movements between the tractor and trailer as well as between the tractor and trailer body in all conditions of lift and repose.

In use the trailer is loaded while in the level position such as shown in FIG. 1. When the load is to be discharged, the tractor brakes are locked and the hydraulic ram is energized lifting the forward end of the trailer and due to the fact that the reaches 11, 11 are of fixed length, this tilting action will tend to bring the rear wheels toward the tractor as it is tipped. Alternatively, of course, the tractor brakes may be left off and the brakes set on the trailer wheels in which case the tipping of the trailer will be accompanied by a rearward movement of the tractor toward the trailer. It is particularly to be noted that the construction is simpler than any heretofore employed for the purpose and that the universal joints which interconnect the hydraulic ram assembly with the tractor fifth wheel at the one end and with the trailer body at the other will accommodate all angular positions of the tractor and trailer relative to each other both about the axis of the fifth wheel and in the various tilted positions of the trailer. Furthermore, it will be noted that all tractive effort is imposed on the trailer through the reaches and that none of this effort is imparted through the hydraulic ram mechanism except such as is incidental to moving either the tractor or the trailer closer together or farther apart incident to the tilting action and that such movement is in part derived from the connection of a trailer to the fifth wheel through the reaches. It is particularly to be noted that all of the parts are of simple design, wherefore, the construction is economical. Further, since the parts are simple in design, the servicing of the equipment including the replacement of worn out parts and the like is also readily achieved without the need for great skill in so doing. Further simplification derives from the fact that there is no necessity for a tilting mounting for the fifth wheel about an axis transverse of the tractor.

Thus there has been created a tractor and trailer combination which is permanently connected and which includes a trailer dumping means of simple construction and which is effective in all relative positions of the trailer about the axis of the fifth wheel interposed between the tractor and trailer and, while the foregoing specification discloses a presently preferred embodiment of the invention, it is not to be inferred therefrom that the invention is confined to the specific example thus disclosed. For example, while the trailer shown in the foregoing disclosure is of the type comprising a body mounted on a frame structure, the invention is equally applicable to those trailers in which the body itself serves additionally as the vehicle frame thus resulting in what is known in the trade as a "frameless" body. Accordingly, it will be understood that the invention includes all such changes and modifications in the parts and in the construction, combination and arrangement of parts as shall come within the purview of the appended claims.

I claim:

1. In combination, a tractor including wheels, a frame, a cab on the forward portion of said frame, and a fifth wheel device on the rear portion of said frame; said fifth wheel device including a stationary component fixed to said rear portion of said frame and a movable component mounted on said stationary component for relative rotative movement about a vertical axial line, a trailer having a frame, wheels supporting the rear end of said frame, means on the front end of said frame adapted to rest on said movable component of said fifth wheel device, and a body mounted on said trailer frame, means for transmitting tractive effort of said tractor to said trailer comprising reach means interconnecting said tractor and trailer and pivotally attached to said movable fifth wheel component for movement about a horizontal axial line extending transversely of the trailer and means pivotally attaching said reach means to said trailer frame at about the mid length of said trailer frame; for movement about a horizontal line also extending transversely of said trailer, a hydraulic ram means for lifting the front end of said trailer for dumping a load carried thereby, means attaching one end of said hydraulic ram means to the front end of said trailer with capacity for angular movement of said hydraulic ram means relative to the trailer, and other means disposed in the axial line of said fifth wheel for attaching the other end of said hydraulic ram means to said tractor independently of said movable fifth wheel component with capacity for angular movement of said ram relative to said tractor.

2. A combined tractor and trailer as claimed in claim 1 in which said hydraulic ram means constitutes a cylinder and piston which are relatively rotatable with resultant accommodation to angular movements of the tractor and trailer relative to each other about the axial line of said fifth wheel device.

3. A combined tractor and trailer as claimed in claim 1 in which said hydraulic ram means and said attaching means for said hydraulic ram means include devices effective to accommodate all changes in angular relationship to said tractor and said trailer deriving from extension and retraction of said hydraulic ram in all positions of said tractor and trailer relative to each other about the axial line of said fifth wheel device.

4. A combined tractor and trailer as claimed in claim 1 in which one end of said hydraulic ram means is attached to said tractor by a ball and socket device disposed with the point of generation of the surface of the ball component of said device substantially in the axial line of said fifth wheel device and movable about a point on said axial line which is substantially at the intersection of said axial line by a plane containing the line of bearing support of said movable component on said stationary component of said fifth wheel device.

5. A combined tractor and trailer as claimed in claim 1 in which said hydraulic ram means comprises cylinder means and piston means reciprocable in said cylinder means and including a piston rod extending beyond one end of said cylinder means, and in which said cylinder means and said piston rod are attached, respectively, to said tractor and to said trailer by ball and socket joint means.

6. In combination, a tractor including wheels, a frame, a cab on the forward portion of said frame, and a fifth wheel device on the rear portion of said frame; said fifth wheel device including a stationary component comprising a vertical axis ring member fixedly mounted on the tractor and affording bearing support for a vertically co-axially disposed movable ring mounted thereon, a trailer including a frame, wheels supporting the rear end of said frame, and a body mounted on said frame, means for connecting said trailer to said tractor comprising a pair of rearwardly extending, laterally spaced reaches, means attaching the front ends of said reaches to said movable ring in laterally spaced relation to each other for free pivotal movement about a horizontal line extending transversely of said trailer, means attaching the rear ends of said reaches to said trailer frame in laterally spaced relation to each other for free pivotal movement about an axial line parallel to the axial line of said means attaching said reaches to said movable ring, means for elevating the front end of said trailer incident to dumping a load carried thereby comprising a hydraulic ram device having one end thereof mounted on and attached to said tractor independently of said movable ring and at a point substantially coincident with the axial line of said movable ring and having its other end attached to the front end of said trailer body by means affording relative angular movement between said hydraulic ram device and said trailer body.

7. A combined tractor and trailer as claimed in claim 6 in which said means for attaching said hydraulic ram device to said tractor includes a stationary bracket fixedly mounted on said tractor and extending upwardly through said rings comprising said fifth wheel device, and bearing devices attaching one end of said hydraulic ram to said bracket for movement about a horizontal axial line extending transversely of the trailer and intersecting the axial line of said fifth wheel device substantially in the plane containing the line of bearing support of said movable ring by said stationary ring.

8. A combined tractor and trailer as claimed in claim 6 in which said means for attaching said hydraulic ram device comprises a stationary bracket extending upwardly through said rings comprising said fifth wheel device and terminating in a spherical socket having a bearing surface generated about a point in the axial line of said rings substantially at the intersection of said axial line by the plane containing the line of bearing support of said movable ring by said stationary ring, and in which the connected end of said hydraulic ram carries a ball freely movable in said socket.

9. A combined tractor and trailer as claimed in claim 6 in which said hydraulic ram device comprises cylinder means and piston means reciprocable and rotatable in said cylinder means and including a piston rod extending beyond one end of said cylinder means, and in which said cylinder means and said piston rod are attached, respectively, to said tractor and to said trailer by universal joint means utilizing the capacity of relative rotation between said cylinder means and said piston means to accommodate angular movements between said tractor and trailer about the axial line of said fifth wheel.

10. A combined tractor and trailer as claimed in claim 6 in which said hydraulic ram device is attached respectively to said tractor and to said trailer by ball and socket means permitting extension and retraction of said hydraulic ram device with incident raising and lowering of the front end of said trailer in all angular positions of said tractor and trailer relative about the axial line of said fifth wheel means.

11. A combined tractor and trailer as claimed in claim 1 in which the end of said hydraulic ram which is attached to said tractor is attached by bearing means having capacity for universal movement about a point disposed substantially at the intersection of the axial line of said fifth wheel with a plane containing the bearing support surface of said fifth wheel movable component; said capacity for universal movement being sufficient in extent to accommodate all movements of said trailer body relative to said tractor and in all extents of elevations of the trailer body by action of said hydraulic ram.

12. In combination, a tractor including wheels, a frame, a cab on the forward portion of said frame, and a fifth wheel on the rear portion of said frame; said fifth wheel device including a stationary component comprising a vertical axis ring member fixedly mounted on the tractor and affording bearing support for a vertically co-axially disposed movable ring mounted thereon, a trailer including a frame and body structure, wheels supporting the rear end of said frame and body structure, means for connecting said trailer to said tractor comprising a pair of rearwardly extending, laterally spaced reaches, means attaching the front ends of said reaches to said movable ring in laterally spaced relation to each other for free pivotal movement about a horizontal line extending transversely of said trailer, means attaching the rear ends of said reaches to said trailer frame and body structure in laterally spaced relation to each other for free pivotal movement about an axial line parallel to the axial line of said means attaching said reaches to said movable ring, means for elevating the front end of said trailer incident to dumping a load carried thereby and comprising a hydraulic ram device having one end mounted on and attached to said tractor independently of said movable ring and at a point substantially coincident with the intersection of the axial line of said movable ring with the plane of the bearing support surface for said movable ring and having its other end attached to the front end of said trailer body by means affording relative angular movement between said hydraulic ram device and said trailer frame and body structure.

References Cited in the file of this patent

UNITED STATES PATENTS

| | | |
|---|---|---|
| 1,819,411 | Flowers | Aug. 18, 1931 |
| 2,605,134 | Clement et al. | July 29, 1952 |